(12) United States Patent
Lee

(10) Patent No.: US 7,796,548 B2
(45) Date of Patent: Sep. 14, 2010

(54) TIME SYNCHRONIZATION METHOD IN MOBILE STATION BASED ON ASYNCHRONOUS SCHEME AND SYSTEM USING THE SAME

(75) Inventor: Young-Je Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 467 days.

(21) Appl. No.: 11/386,489

(22) Filed: Mar. 22, 2006

(65) Prior Publication Data

US 2006/0233132 A1   Oct. 19, 2006

(30) Foreign Application Priority Data

Apr. 18, 2005   (KR)   ........................ 10-2005-0031942

(51) Int. Cl.
*H04Q 7/00*   (2006.01)
(52) U.S. Cl. ................... 370/328; 370/503; 370/338; 370/352; 455/405; 455/406; 455/566; 455/550
(58) Field of Classification Search ............ 370/328, 370/503, 338, 352; 342/357.1; 455/456, 455/426, 566, 550, 406
See application file for complete search history.

(56) References Cited

U.S. PATENT DOCUMENTS

| | | | |
|---|---|---|---|
| 6,198,696 B1 * | 3/2001 | Korpi et al. .................. 368/21 |
| 7,084,810 B2 * | 8/2006 | Kitatani .................. 342/357.12 |
| 2002/0142783 A1 * | 10/2002 | Yoldi et al. .................. 455/456 |
| 2003/0013494 A1 * | 1/2003 | Imura .......................... 455/566 |
| 2003/0107513 A1 * | 6/2003 | Abraham et al. ......... 342/357.1 |
| 2003/0123423 A1 * | 7/2003 | Okanoue .................... 370/338 |
| 2003/0152177 A1 | 8/2003 | Cahill-O'Brien et al. |
| 2004/0023681 A1 | 2/2004 | Zschintzsch |
| 2004/0029536 A1 * | 2/2004 | Hamatsu et al. ............. 455/95 |
| 2005/0181758 A1 * | 8/2005 | Ansamaa .................... 455/406 |

FOREIGN PATENT DOCUMENTS

| | | |
|---|---|---|
| EP | 1 544 697 | 6/2005 |
| EP | 1544697 A | 6/2005 |
| EP | 1 655 644 | 5/2006 |

(Continued)

OTHER PUBLICATIONS

Digital Cellular telecommunications system; ETSI TS 122 042 V6.0.0 (10pgs).

*Primary Examiner*—Charles N Appiah
*Assistant Examiner*—Michael T Vu
(74) *Attorney, Agent, or Firm*—The Farrell Law Firm, LLP

(57) ABSTRACT

Disclosed is a system and a method for setting an internal time corresponding to a standard time at a current location in a mobile station of an asynchronous scheme. The mobile station of the asynchronous scheme uses a Simple Network Time Protocol (SNTP), which is an application of a Network Time Protocol (NTP), allowing the mobile station to easily update internal time information using a synchronized time. The SNTP can provide a time value which can be used to accurately reset an internal time of the mobile station of the asynchronous scheme. By using the SNTP, the mobile station of the asynchronous scheme can obtain exact time information as in a CDMA network and update the mobile station's internal time with the time corresponding to an area in which a standard time is changed.

11 Claims, 4 Drawing Sheets

FOREIGN PATENT DOCUMENTS

| | | |
|---|---|---|
| EP | 1655644 A1 | 5/2006 |
| FR | 2784760 | 4/2000 |
| FR | 2784760 A1 | 4/2000 |
| JP | 2006018375 | 1/2006 |
| JP | 2006018375 A | 1/2006 |
| KR | 10-2003-0062722 | 7/2003 |

* cited by examiner

TIME SYNCHRONIZATION METHOD IN MOBILE STATION BASED ON ASYNCHRONOUS SCHEME AND SYSTEM USING THE SAME

PRIORITY

This application claims priority under 35 U.S.C. §119 to an application entitled "Time Synchronization Method in Mobile Station Based on Asynchronous Scheme and System Using the Same" filed in the Korean Intellectual Property Office on Apr. 18, 2005 and assigned Serial No. 2005-31942, the contents of which are incorporated herein by reference.

BACKGROUND OF THE INVENTION

1. Field of the Invention

The present invention relates generally to a time synchronization method and system, and in particular, to a time synchronization method of a mobile station based on an asynchronous scheme and a system using the same.

2. Description of the Related Art

Global System for Mobile communication (GSM) is a digital mobile communication system widely used in Europe and other areas. The GSM digital mobile communication system is a type of Time Division Multiple Access (TDMA) communication system and is one of three most popular digital mobile communication technologies which include TDMA and a Code Division Multiple Access (CDMA) mobile communication systems. In the GSM communication system, data is digitalized, compressed and transmitted with other user data through a single channel, and each data is transmitted in a unique time band. The GSM communication system can operate in both a 900 MHz and a 1800 MHz communication band. Wideband CDMA (WCDMA) is an asynchronous mobile communication system using the CDMA communication system based on the GSM communication system and a General Packet Radio Services (GPRS) communication system.

Among the above described communication systems, the WCDMA scheme is a communication scheme that can be commonly used throughout the world. Moreover, because a user can use the same mobile station throughout the world, it is necessary to change the mobile station's time information according to each time zone in each country or province. However, unlike the CDMA communication system in which synchronization is set using time, for a mobile station based on the GSM or WCDMA communication systems, time must be manually set unless a relevant network gives time information to the mobile station.

Each typical asynchronous scheme mobile station is equipped with a real time clock (RTC) chip and uses time information provided by the RTC chip. That is, each mobile station displays time by counting the time using a self-operating clock. Though such a clock performs the same function as a typical watch, if a user moves to an area in which time is changed, the user typically has to change the time of the mobile station to match the local time of the area.

Thus, when an asynchronous scheme mobile station moves to an area in which time has changed, if the mobile station cannot get a local time, the time will be counted in a state of having a time difference. Even if the mobile station user can determine a local time, if a user manually sets the time of the mobile station, the user cannot set the exact time to the second.

However, since a method of obtaining time information is not implemented in mobile stations based on asynchronous schemes, there is no easy way to depend upon information transmitted from networks. A communication protocol of providing a message representing time information exists, but in reality, this function is not implemented in the networks. Thus, since it is desirable that a mobile station's an internal clock be reset when a local time changes, it is desirable that a user check a local time at a current location and manually reset an existing time to the local time.

As described above, in the prior art, if a local time at a location where a user uses a mobile station is changed, the user should manually reset an internal clock of the mobile station to the changed local time. For example, if the entire area of a country is included in a single time zone, an additional time change is not required once time has been set. However, in European countries using asynchronous schemes such as GSM and WCDMA, since a plurality of countries are adjacent to each other, if a user moves from a country to another country, a case where a current time should be changed to a local time may frequently occur. Accordingly, since a user using a mobile station using an asynchronous scheme should manually change an internal time of the mobile station, time accuracy is lowered, and it is difficult to obtain reliable time information when compared to a mobile station of a synchronous scheme such as CDMA.

As described above, for a mobile station based on a conventional asynchronous scheme, when a user moves to an area having a standard time which is different than an internal time of the mobile station, the user is inconvenienced by having to manually change the internal time to the standard time (local time) of the area. In addition, according to time setting by an RTC chip equipped in a mobile station based on a conventional asynchronous scheme, since a user manually sets the time, an exact standard time cannot be set. In asynchronous schemes, a technology of exactly setting an internal time of a mobile station by itself by obtaining reliable time information from the outside through communication has not been implemented.

SUMMARY OF THE INVENTION

Accordingly, the present invention provides a method and system for synchronizing time in a mobile station based on an asynchronous scheme, by which reliable time information can be obtained.

Further, the present invention provides a method and system for synchronizing time in a mobile station based on an asynchronous scheme by which an internal time can be synchronized with a standard time by the mobile station.

According to one aspect of the present invention, there is provided a method of synchronizing time in a mobile station based on an asynchronous scheme, the method including determining whether a time information change is required based on location area identification (LAI) when an area movement is detected; performing packet data protocol (PDP) context activation with a time server providing a standard time in a target area by accessing the time server, if the time information change is required; requesting the time server for time synchronization using a Simple Network Time Protocol (SNTP) packet communication after the PDP context activation is performed; obtaining standard time information from the time server through the SNTP packet communication in response to the request; and performing the time synchronization with the obtained standard time information.

According to one aspect of the present invention, there is provided a system for synchronizing time in a mobile station based on an asynchronous scheme, the system including a mobile station for determining whether a time information change is required based on location area identification (LAI) when an area movement is detected, requesting time information using a Simple Network Time Protocol (SNTP) packet communication if the time information change is required, transmitting a time information request and performing time synchronization with standard time information obtained in response to the time information request; and a time server for receiving a time information request transmitted from the mobile station, and transmitting to the mobile station standard time information in response to a time information request from the mobile station using the SNTP packet communication.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
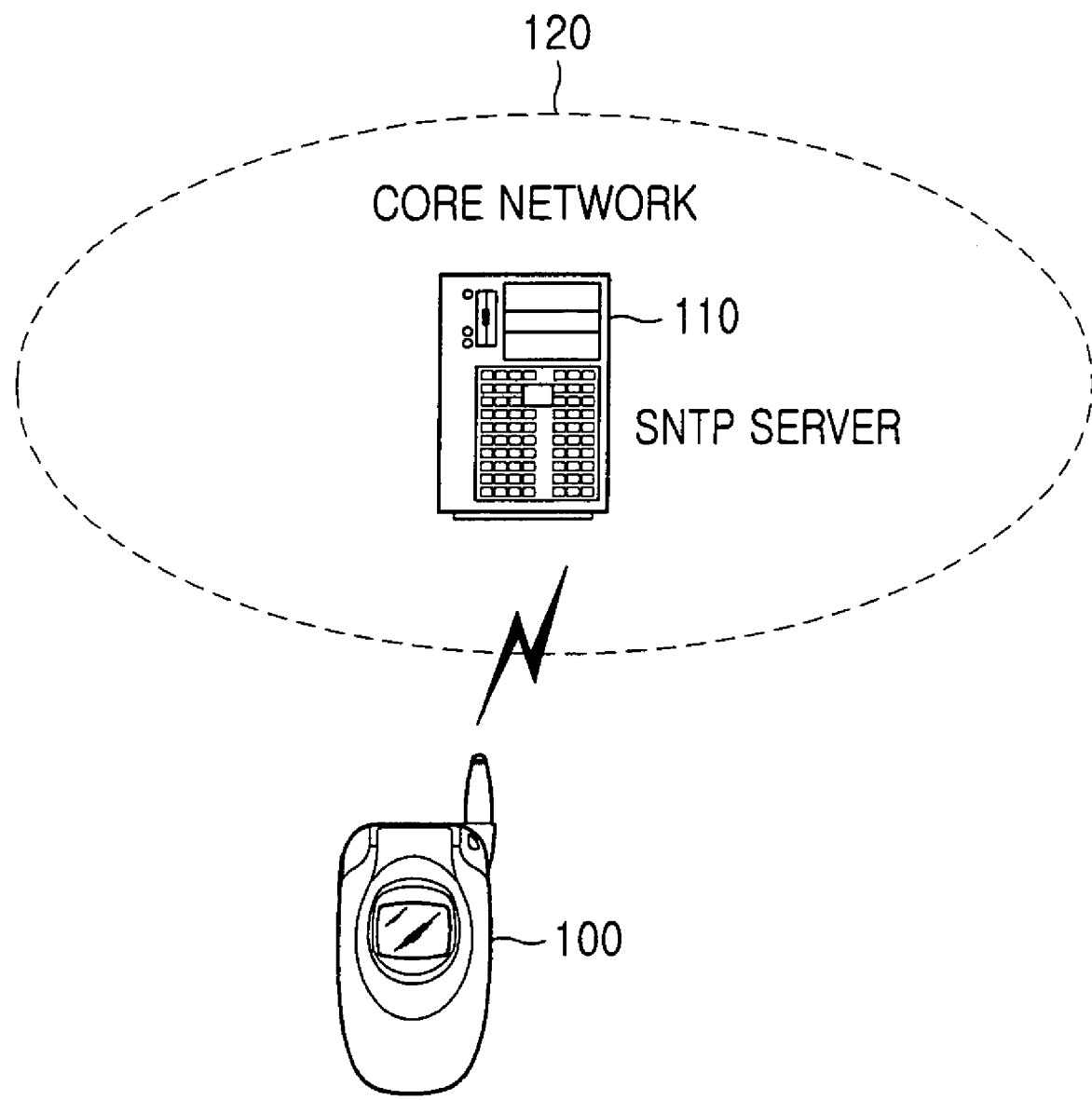
FIG. 1 is a schematic configuration illustrating a time synchronization system according to a preferred embodiment of the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

In the present invention, a function of setting an internal time corresponding to a standard time at a current location in a mobile station of an asynchronous scheme is implemented. To do this, the mobile station of an asynchronous scheme uses a Simple Network Time Protocol (SNTP), which is an application of Network Time Protocol (NTP), allowing the mobile station to easily update internal time information using a synchronized time. The SNTP can provide a time value which can be used to exactly reset an internal time of the mobile station of an asynchronous scheme. By using the SNTP, the mobile station of an asynchronous scheme can obtain exact time information as in a CDMA network and update the internal time by itself with the time suitable for an area in which a standard time is changed.

Elements and operations of a mobile communication system of an asynchronous scheme in which such a function is implemented will be described below with reference to FIG. 1 which is a schematic configuration illustrating a time synchronization system according to a preferred embodiment of the present invention. The time synchronization system using an SNTP server according to a preferred embodiment of the present invention will now be described in detail with reference to FIG. 1.

Referring to FIG. 1, the time synchronization system, which can synchronize time of a mobile station based on an asynchronous scheme, includes a mobile station 100 and a core network 120 including an SNTP server 110. When the mobile station 100 of an asynchronous scheme is turned off and thereafter moves to an area in which a standard time is changed and is then turned on, the time synchronization system to which a preferred embodiment of the present invention is applied enables the mobile station 100 to reset its own internal clock to the time suitable for the new area. In another case, when the mobile station 100 moves to a country in which a standard time change is requested or to an area in which a standard time is changed in the same country, the time synchronization system allows the mobile station 100 to detect the situation and update its internal clock by itself. To do this, the mobile station 100 of an asynchronous scheme uses an SNTP packet used in a wired network in order to obtain exact time information from the outside.

The mobile station 100 can include a mobile communication terminal such as a cell phone, PDA, or a laptop PC. In particular, the mobile station 100 is based on an asynchronous scheme and processes a call by accessing the core network 120 and supports both a circuit service (CS) and a packet service (PS).

The mobile station 100 in the time synchronization system using the SNTP accesses the core network 120 using communication technology such as GSM or WCDMA, and to do this, elements for connecting the mobile station 100 and the core network 120, a base station (not shown) and a radio network controller (RNC) (not shown) are implemented, e.g., in the WCDMA scheme. Data transmission and/or reception between the mobile station 100 and the SNTP server 110 is/are achieved through the elements connected to the core network 120.

Hereinafter, the core network 120 is defined as the sum of elements constructing a GSM or WCDMA communication system for providing a mobile communication service to the mobile station 100. That is, a network for providing a mobile communication service to the mobile station 100 is called the core network 120.

A network element designated as a time server, i.e., the SNTP server 110, is a standard of a time synchronization protocol, and if the mobile station 100 requests the SNTP server 110 providing a standard time for a service by transmitting a packet using the SNTP, the SNTP server 110 transmits a packet containing standard time information to the mobile station 100 in a format for the SNTP. That is, there are a plurality of SNTP servers providing standard time information in every area, and thereby other mobile stations also receive the standard time information using the SNTP. Likewise, the SNTP server 110 plays a role of updating or synchronizing the internal clock of the mobile station 100.

In the present invention, a method of performing time synchronization in the mobile station 100 in a relevant area is disclosed, wherein the mobile station 100 obtains time information from the SNTP server 110 in the area through SNTP packet communication. Prior to description of the present invention, the SNTP used in the present invention will now be schematically described.

The SNTP is an application form of an NTP used to set an internal clock computer on the Internet and is included in a user datagram protocol (UDP) packet for transmission. In other words, the SNTP is a protocol used to synchronize a clock time between network elements connected to each other via a network. The SNTP is used presently as an Internet standard and can transmit a current time in a second unit on the basis of 00 o'clock Jan. 1, 1900 format, and can provide time information having accuracy of up to 200 picoseconds considering synchronization technology and traffic on a network such as the Internet.

Figure 2:
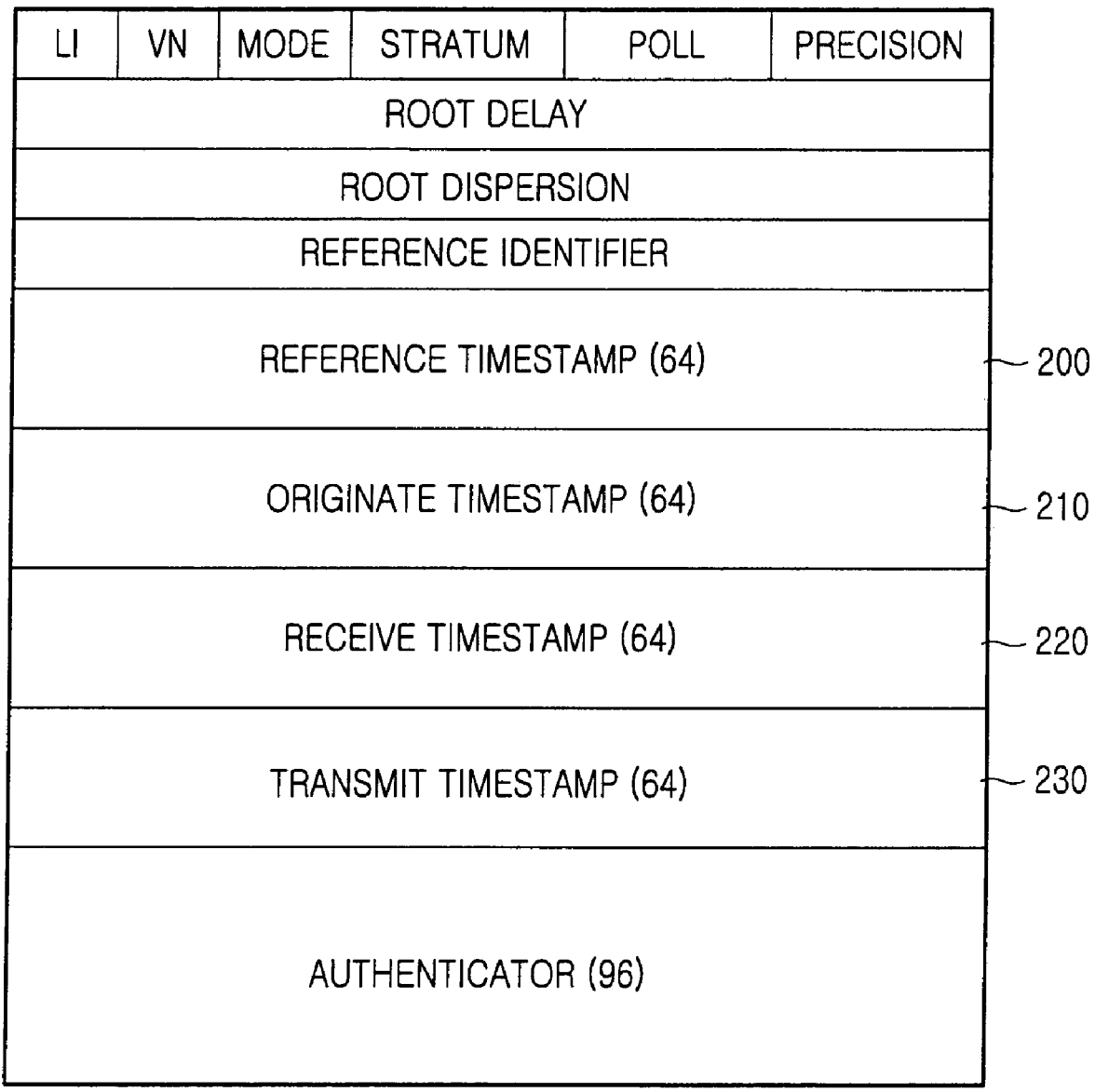
FIG. 2 is a diagram illustrating an SNTP configuration according to a preferred embodiment of the present invention.

The configuration of the SNTP will now be schematically described with reference to FIG. 2 which is a diagram illustrating an SNTP configuration according to a preferred embodiment of the present invention. Since the SNTP is used in both a client and a server, a "mode" field containing a mode identifier for identifying an SNTP server or a terminal, such as an SNTP client, is implemented.

The SNTP configuration includes a plurality of other fields for sharing corresponding information. Both the fields and/or the corresponding information contained in the fields may be referred to using the same terms. The SNTP field also include a "root delay" field for indicating a total round delay corresponding to a primarily referenced SNTP server, a "root dispersion" field for indicating a normal error related to the primarily referenced SNTP server, a "reference timestamp" field 200 for recording the time when a local clock is finally set or updated, an "originate timestamp" field 210 for recording the time when a request to the server is transmitted from the client, a "receive timestamp" field 220 for recording the time when the request arrives at the server, and a "transmit timestamp" field 230 for recording the time when a response is transmitted from the server to the client. In particular, according to a preferred embodiment of the present invention, when the mobile station (i.e., the client) 100 requests a standard time, the SNTP server 110 transmits current time information according to a pre-set precision based on a receive timestamp contained in the receive timestamp field 220 or a transmit timestamp contained in the transmit timestamp field 230.

Based on the above description, the SNTP provides time information and information on delay factors, and since each of the SNTP client and the SNTP server transmits time information on each status, a time delay can be estimated from a delivered time using those factors. Thus, time information delivered to the mobile station 100 is adjusted before transmission by considering the amount of time required for transmission before the SNTP server 110 transmits the time information to the mobile station 100. Using the SNTP and the SNTP server 110 which is a time server, a system which cannot obtain synchronized time information, such as a system accessing a network using an asynchronous communication scheme, also can obtain accurate synchronized time information.

In a communication system using an asynchronous scheme such as GSM or WCDMA, when the mobile station 100 moves to an area in which there exists a time difference (e.g., the time zone has changed), the mobile station 100 detects the time difference based on LAI information. The LAI information is used to identify areas which the asynchronous communication system covers, commonly provided in both the GSM and WCDMA schemes, and automatically updated if it is determined that changed information wherein predetermined information is continuously monitored and checked in every predetermined period for changed information. Here, the LAI information is information provided by the core network 120 and includes a mobile country code (MCC), a mobile network code (MNC) and a location area code (LAC).

Thus, in every predetermined period, when an area movement is detected or when the mobile station 100 moves from an area managed by a communication service provider in a country to another country, the mobile station 100 can determine a country and/or a location in which the mobile station 100 is currently located using the LAI information provided from the core network 120 and identify a connected communication service provider in the country and/or location. In addition, when a time difference exists in one country and/or location, the mobile station 100 can identify areas in which the time difference occurs through the provided LAI information.

Information on such a service situation of the mobile station 100 is pre-stored in an internal Subscriber Identity Module (SIM) card or a Nonvolatile Random Access Memory (NVRAM) so that the information can be referred to even when the mobile station 100 is turned on and/or off, and the information based on a standardized time such as Greenwich Mean Time (GMT) which is an international standard time. To request for standard time information, the mobile station 100 should access the SNTP server 110, and to do this, standard time servers can be assigned in every country or in every area in which a time difference occurs. Herein, such information should be stored with the information on the service situation described above.

A detailed example to which a preferred embodiment of the present invention is applied will now be described.

The mobile station 100 stores an Internet protocol (IP) address of the SNTP server 110 in a relevant area. Thus, without re-inputting time whenever the mobile station 100 is turned on and/or off, the mobile station 100 receives an allocation of an IP address of the mobile station 100 by establishing a CS call or a PS call when the mobile station 100 is turned on, transmits a UDP packet including the SNTP to the SNTP server 110 in the corresponding area, and receives standard time information of a current area in response to the transmission through the SNTP. Likewise, the mobile station 100 can set an initial time through time information provided from the SNTP server 110 as soon as the mobile station 100 is turned on, and in particular, since the SNTP can represent time information smaller than a unit of year, month, and day, the time of an internal clock of the mobile station 100 can be accurately updated (or reset) to a standard time.

Figure 3:
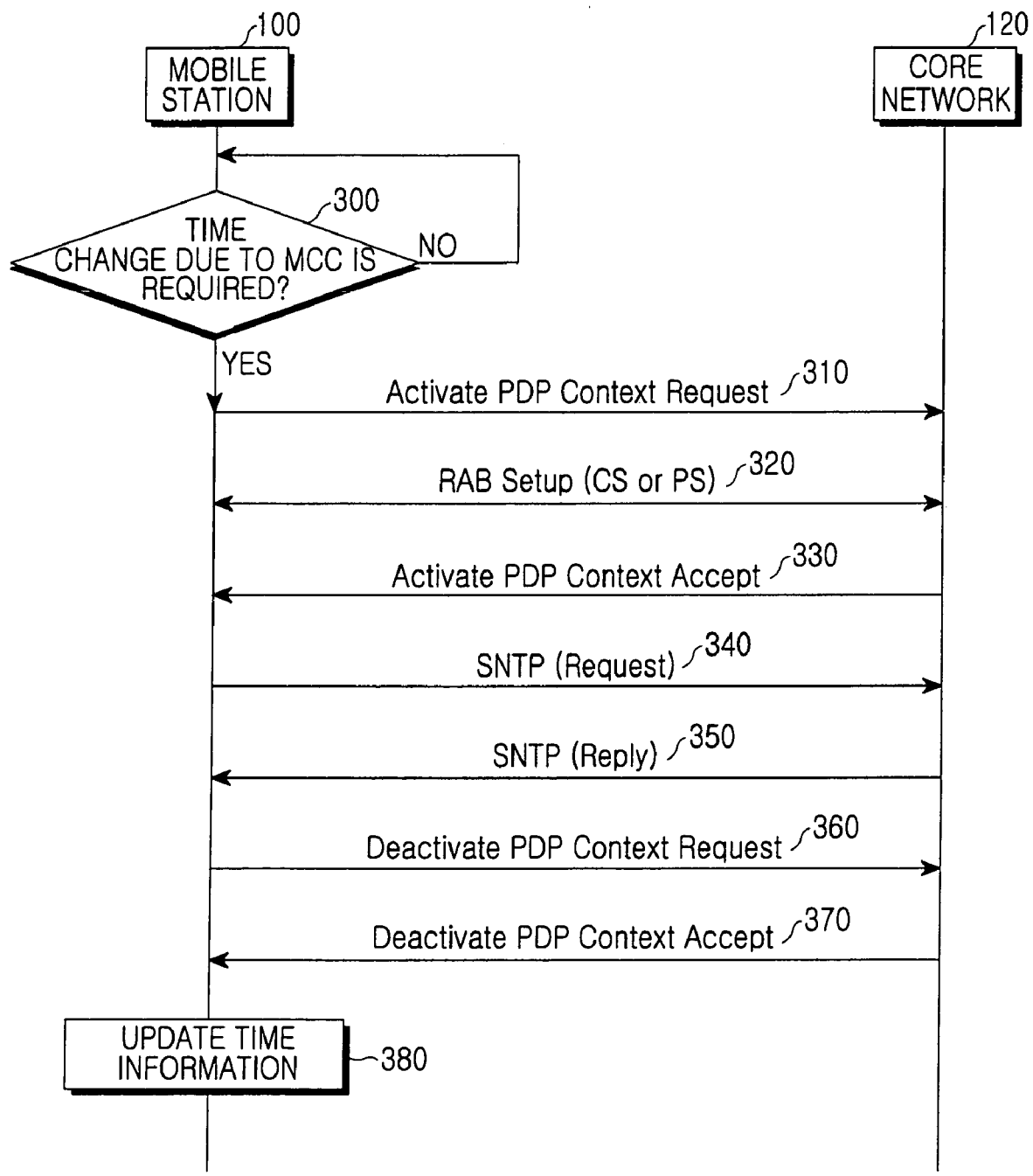
FIG. 3 is a combined flow chart and flow diagram illustrating a process of providing time information between a mobile station and a core network according to a preferred embodiment of the present invention.

While a case of setting an initial time when mobile station 100 is turned on has been described, a case where mobile station 100 moves to another country in which time is changed will now be described with reference to FIG. 3. FIG. 3 is a combined flow chart and flow diagram illustrating a process of providing time information between the mobile station 100 and the core network 120 according to a preferred embodiment of the present invention.

In a movement of the mobile station 100 between countries where a time difference occurs, a code of each country (or location) in which a time change is required can be, for instance, set by comparing a time of a current country to a time of a relevant country, and an MCC is allocated to each country in which a time difference occurs based on the time of the current country as a result of the comparison. Herein, a standard time for comparison of time differences between countries is based on the GMT information. A code of each country in which a time change is required is stored in the mobile station 100 as an MCC of the LAI information.

For example, when a movement between countries is detected, the mobile station 100 determines whether an MCC provided from the core network 120 is stored in the mobile station 100, and if there exists a matched MCC, the mobile station 100 can be synchronized with the time suitable for the country by performing an operation of changing its internal clock to a standard time of the country.

Referring to FIG. 3, in a case of detecting whether an area movement is achieved by checking for an area movement in predetermined periods, in step 300, the mobile station 100 determines whether a time change according to an MCC is required. In detail, the mobile station 100 determines whether a time change of its internal clock is required by determining whether an MCC which corresponds with an MCC included in LAI information provided from the core network 120 exists in MCCs pre-stored in the mobile station 100. If is determined that a corresponding MCC exists, the mobile station 100 transmits an activate PDP context request message to the core network 120 in order to transmit a packet, in step 310. Parameters included in the activate PDP context request message include a PDP type, a PDP address, and an access point network (APN). Herein, the PDP address is the IP address of the mobile station 100.

In step 320, the core network 120, which has received the activate PDP context request message, sets a radio access bearer (RAB) with the mobile station 100 by transmitting an RAB setup message to the mobile station 100. By doing this, resource allocation required for wireless packet transmission between the mobile station 100 and the core network 120 is accomplished. When actual packet transmission is possible, in step 330, the core network 120 transmits an activate PDP context accept message to the mobile station 100.

As the mobile station 100 receives the activate PDP context accept message, a radio channel is generated between the mobile station 100 and the core network 120. When the radio channel is generated, the mobile station 100 generates an SNTP to request for a standard time of a country (or a time region) in which the mobile station 100 is located at the moment, and in step 340, the mobile station 100 transmits the generated SNTP to the core network 120. In particular, according to a preferred embodiment of the present invention, the mobile station 100 requests for time information by transmitting a packet to the SNTP server 110, (which provides standard time information of a relevant country), in the core network 120 using the SNTP. As a reply on the SNTP transmission of the mobile station 100, in step 350, the SNTP server 110 in the core network 120 generates a standard time corresponding to the received SNTP in a format suitable for the SNTP and transmits a packet containing the standard time to the mobile station 100.

In step 360, the mobile station 100, which has received the packet containing the standard time, transmits a deactivate PDP context request message to the core network 120 in order to release the activate PDP context. The mobile station 100 receives as a reply to the deactivate PDP context request message, the deactivate PDP context accept message, in step 370. After the access release is performed, the mobile station 100 returns to or enters an idle state. In step 380, the mobile station 100 performs an operation of updating the time of its internal clock using information, such as a reference timestamp or a transmit timestamp, in a format of the SNTP contained in the packet transmitted from the SNTP server 110 in the core network 120 as the reply on the SNTP transmission.

While timing that the time of the internal clock is updated is after an access with the core network 120 is released as described above, a user can be allowed to select whether a time change is performed by displaying contents related to the time change on a screen as soon as a time change is required according to an MCC.

Figure 4:
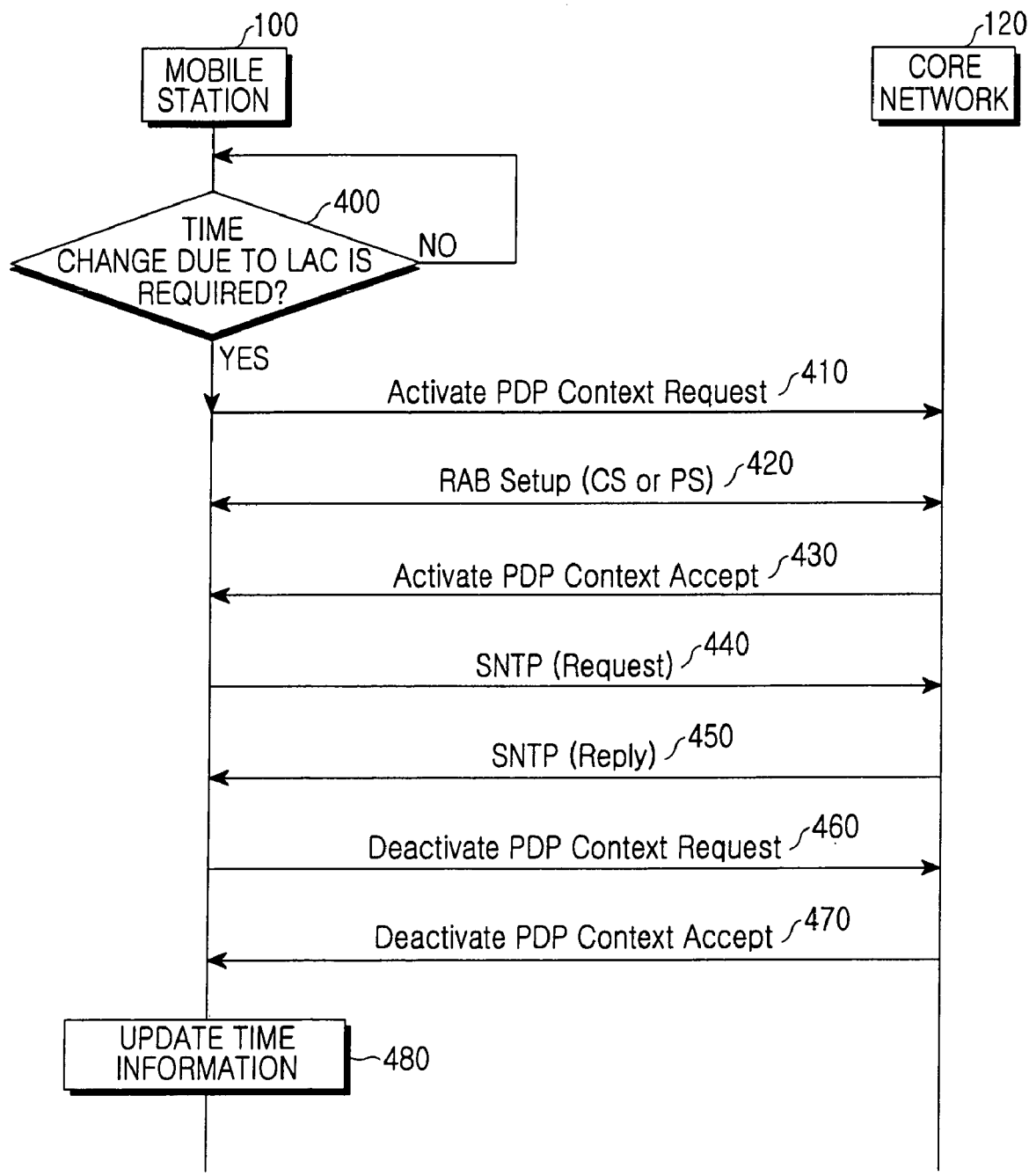
FIG. 4 is a combined flow chart and flow diagram illustrating a process of providing time information between the mobile station and the core network according to another preferred embodiment of the present invention.

FIG. 4 is combined flow chart and a flow diagram illustrating a process of providing time information between the mobile station 100 and the core network 120 according to another preferred embodiment of the present invention. A case where the mobile station 100 moves between areas in which a time difference occurs even if the mobile station 100 moves in the same country will now be described with reference to FIG. 4.

Typically in larger countries, a time difference can occur between areas even if its MCC is the same. For example, a country can have a plurality of time zones or can institute various time standards which can change a local time (e.g., daylight savings time, eastern standard time, etc.). Thus, according to another preferred embodiment of the present invention, the mobile station 100 receives LAI information when it moves between areas and can know whether a target area is an area in which time is changed through an LAC among a plurality of types of information included in the LAI information.

Referring to FIG. 4, when an area movement is detected, the mobile station 100 receives LAI information and analyzes an LAC included in the LAI information. In step 400, the mobile station 100 determines whether a time change is required according to a result of the analysis. In detail, the mobile station 100 determines whether an LAC corresponding to the received LAC exists in LACs stored in the mobile station 100. If a corresponding LAC exists as a result of the determination, the mobile station 100 recognizes that the time of its internal clock should be changed and performs steps 410 to 480. Herein, since steps 410 to 480 of FIG. 4 correspond with steps 310 to 380 of FIG. 3, for the sake of clarity, detailed description has been omitted.

While a case where the mobile station 100 determines when a time change is performed through an MCC or an LAC according to a movement of the mobile station 100 and updates internal time information has been described, a case where a time difference is generated when the mobile station 100 moves from an area which a current communication service provider manages to an area which another communication service provider manages may exist. In this case, the mobile station 100 compares public land mobile networks (PLMNs) to each other based on an MCC and an LAC, and if a target PLMN is a PLMN requiring a time change as a result of the comparison, the mobile station 100 updates time information of its internal clock using such procedures as in FIG. 3 and FIG. 4.

As described above, according to embodiments of the present invention, a time synchronization method and system can be commonly used in a GSM communication network and a WCDMA communication network, exact time information as in a CDMA communication network can be obtained. Since a mobile station of an asynchronous scheme can automatically set time suitable for a target area in an area having a time difference, a user does not have to manually set time (e.g., by calculating the time difference every time when the time difference exists). Furthermore, since conventionally used call procedures are used, an additional message or procedure is not required, and since exact time information can be obtained, user convenience can be enhanced.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method of synchronizing time in an asynchronous scheme mobile station, the method comprising the steps of:
   receiving location area identification (LAI) information in a current location area of the mobile station according to movement of the mobile station;
   determining whether the mobile station is located in an area having a time difference based on the LAI information;
   performing packet data protocol (PDP) context activation with a time server providing standard time information of the current location area of the mobile station by accessing the time server when the mobile station is located in the area having the time difference;

requesting to the time server a time synchronization through Simple Network Time Protocol (SNTP) packet communication after the PDP context activation is performed;

obtaining standard time information from the time server through the SNTP packet communication in response to the request; and performing the time synchronization with the obtained standard time information.

2. The method of claim 1, wherein the step of performing the PDP context activation comprises the steps of:

transmitting, by the mobile station, an activate PDP context request message to the time server;

setting, by the time server, a call using one of a circuit service (CS) call and a packet service (PS) call, in response to the activate PDP context request message; and transmitting an activate PDP context accept message to the mobile station.

3. The method of claim 1, wherein the LAI information includes a mobile country code (MCC), a mobile network code (MNC) and a location area code (LAC).

4. The method of claim 3, further comprising the steps of:

storing MCCs of countries in which a time change is required in the mobile station using Greenwich Mean Time (GMT) information;

when the mobile station moves to a certain country, comparing the MCCs stored in the mobile station to an MCC provided from a time server of the country;

requesting a call setup and receiving an allocated Internet protocol (IP) address, if it is determined that a matched MCC exists, requesting standard time information through an SNTP packet, if the allocated IP address is received; and receiving the standard time information in response to the request for standard time information and updating internal time information of the mobile station.

5. The method of claim 4, further comprising the step of:

informing a user that the country is an area in which a time change is required, if it is determined that a matched MCC exists.

6. The method of claim 3, further comprising the steps of:

storing LACs of areas in which a time change is required in the mobile station using information corresponding to Greenwich Mean Time (GMT) information;

when a predetermined area is detected, comparing the LACs stored in the mobile station to a LAC provided from a time server of the area to determine whether a matched LAC exists;

requesting a call setup and receiving an allocated Internet protocol (IP) address, if it is determined that a matched LAC exists;

requesting standard time information through an SNTP packet, if it is determined that the allocated is received; and receiving the standard time information in response to the request for standard time information and updating internal time information of the mobile station.

7. The method of claim 3, further comprising the steps of:

storing MNCs of service providers in which a time change is required in the mobile station using information corresponding to Greenwich Mean Time (GMT) information;

comparing the MNCs stored in the mobile station to an MNC provided from a time server of a target area, when the mobile station moves between service areas which are served by different service providers;

requesting a call setup and receiving an allocated Internet protocol (IP) address, if it is determined that a matched MNC exists;

requesting standard time information through an SNTP packet, if the allocated IP address is received; and receiving the standard time information in response to the request for standard time information and updating internal time information of the mobile station.

8. The method of claim 1, wherein when the mobile station is turned on, the mobile station accesses the time server using a pre-stored address of the time server, transmits an SNTP packet to the time server, and sets an initial time by receiving the standard time information.

9. The method of claim 1, wherein the step of obtaining of the standard time information from the time server through the SNIP packet communication includes acquiring the standard time using information corresponding to one of a receive timestamp field and a transmit timestamp field of the SNIP packet.

10. A system for synchronizing time in an asynchronous scheme mobile station, the system comprising:

a mobile station for:

receiving location area identification (LAI) information in a current location area of the mobile station according to movement of the mobile station, determining whether the mobile station is located in an area having a time difference based on the LAI information, requesting standard time information of the current location area of the mobile station through a Simple Network Time Protocol (SNTP) packet communication, when the mobile station is located in the area having the time difference, and performing time synchronization with standard time information obtained in response to the request for standard time information; and a time server for transmitting to the mobile station through the SNTP packet communication standard time information in response to a request for time information if the request for time information is transmitted from the mobile station.

11. The system of claim 10, wherein the LAI information includes a mobile country code (MCC), a mobile network code (MNC) and a location area code (LAC).

* * * * *